United States Patent
Tamai et al.

(10) Patent No.: US 12,535,126 B1
(45) Date of Patent: Jan. 27, 2026

(54) DRIVE UNIT INCLUDING A CONCENTRIC PLANETARY GEAR SYSTEM HAVING DUAL HELICAL GEARS

(71) Applicant: GM GLOBAL TECHNOLOGY OPERATIONS LLC, Detroit, MI (US)

(72) Inventors: Goro Tamai, Bloomfield Hills, MI (US); Pete R. Garcia, North Branch, MI (US); Shawn H. Swales, Farmington, MI (US); Dumitru Puiu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/979,866

(22) Filed: Dec. 13, 2024

(51) Int. Cl.
*F16H 37/08* (2006.01)
*B60L 50/60* (2019.01)

(52) U.S. Cl.
CPC ............ *F16H 37/082* (2013.01); *B60L 50/60* (2019.02)

(58) Field of Classification Search
CPC ......... F16H 37/082; F16H 37/041; F16H 1/46
See application file for complete search history.

(56) References Cited

U.S. PATENT DOCUMENTS 6,966,865 B2 * 11/2005 Drago ................. F16H 1/28
475/342
11,542,829 B2 * 1/2023 Facchini ................ F02C 7/36
2018/0112740 A1 4/2018 Matsumoto
2023/0151875 A1 * 5/2023 Swales ................. B60K 1/00
74/331

FOREIGN PATENT DOCUMENTS

DE 1061708 B 7/1959
GB 917855 A * 2/1963 .......... F16H 1/2809
WO WO-2018049711 A1 3/2018

OTHER PUBLICATIONS

German Office Action from counterpart DE1020251041245, dated Jul. 11, 2025.

* cited by examiner

*Primary Examiner* — Huan Le (57) ABSTRACT

A drive unit includes a housing, a shaft, and a planetary gear set connected to the shaft and the housing. The planetary gear set includes a sun gear including a first helical gear portion and a second helical gear portion, a carrier axially offset relative to the sun gear, and a plurality of planet gears connected with the sun gear. Each of the plurality of planet gears includes a planet gear support shaft connected to the carrier, a first planet gear member supported by the planet gear support shaft including a first helical gear operatively connected to the first helical gear portion and a second planet gear member supported by the planet gear support shaft. The second planet gear member includes a second helical gear operatively connected to the second helical gear portion. The second planet gear member is axially shiftable relative to the first planet gear member.

20 Claims, 8 Drawing Sheets

FIG. 8

DRIVE UNIT INCLUDING A CONCENTRIC PLANETARY GEAR SYSTEM HAVING DUAL HELICAL GEARS

FIELD

The present disclosure relates to the art of vehicles and, more particularly, to a drive unit for an electric vehicle having a concentric planetary gear set with dual helical gears.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A drive unit serves as an interface between a vehicle motor and a drive train. Often times, the drive unit itself will house an electric motor that is connected to a gear train. The gear train may be controlled to produce various gear ratios that control vehicle speed. In some cases, the gear train may include gears that shift along shafts to connect with other gears to establish the different gear ratios. In other cases, the gear train may include a continuously variable gear set. In still other cases, the gear train may include planetary gears.

SUMMARY

A drive unit for a vehicle, in accordance with the present disclosure, includes a housing, a shaft extending through the housing, and a planetary gear set arranged in the housing and operatively connected to the shaft and the housing. The planetary gear set includes a sun gear including a first helical gear portion and a second helical gear portion, a carrier arranged in the housing and axially offset relative to the sun gear, and a plurality of planet gears operatively connected with the sun gear. Each of the plurality of planet gears include a planet gear support shaft operatively connected to the carrier, a first planet gear member supported by the planet gear support shaft including a first helical gear operatively connected to the first helical gear portion and a second planet gear member supported by the planet gear support shaft. The second planet gear member includes a second helical gear operatively connected to the second helical gear portion. The second planet gear member is axially shiftable relative to the first planet gear member.

In other features, the first planet gear member includes a step portion, the second planet gear member being arranged on the step portion of the first planet gear member.

In other features, a ring gear is arranged about the plurality of planet gears, the ring gear including an inner annular surface including a plurality of ring gear teeth operatively connected with the plurality of planet gears.

In other features, the ring gear is a double helical gear including a first ring gear section and a second ring gear section, the plurality of ring gear teeth including a first plurality of ring gear teeth on the first ring gear section and a second plurality of ring gear teeth on the second ring gear section.

In other features, the first helical gear of the first planet gear member is operatively connected with the first plurality of ring gear teeth and the second helical gear of the second planet gear member is operatively connected with the second plurality of ring gear teeth.

In other features, the carrier is grounded to the housing.

In other features, another planetary gear set is supported by the shaft, the another planetary gear set including another sun gear operatively connected to the ring gear, another plurality of planet gears operatively connected with the another sun gear, and another ring gear operatively connected to the another plurality of planet gears.

In other features, an output carrier is operatively connected to the another plurality of planet gears, the output carrier including a differential gear set operatively connected to the shaft.

In other features, the carrier is grounded relative to the housing and the output carrier is rotatable relative to the housing.

In other features, another shaft is operatively connected to the differential gear set, wherein the shaft defines a first half shaft, and the another shaft defines a second half shaft.

A vehicle, in accordance with the present disclosure, includes a body defining in part a passenger compartment, an energy storage device supported by the body, and a drive unit supported in the body and connected to the energy storage device. The drive unit includes a housing, a shaft extending through the housing, and a planetary gear set arranged in the housing and operatively connected to the shaft and the housing. The planetary gear set includes a sun gear including a first helical gear portion and a second helical gear portion, a carrier arranged in the housing and axially offset relative to the sun gear, and a plurality of planet gears operatively connected with the sun gear. Each of the plurality of planet gears includes a planet gear support shaft operatively connected to the carrier, a first planet gear member supported by the planet gear support shaft including a first helical gear operatively connected to the first helical gear portion and a second planet gear member supported by the planet gear support shaft. The second planet gear member includes a second helical gear operatively connected to the second helical gear portion. The second planet gear member is axially shiftable relative to the first planet gear member.

In other features, the first planet gear member includes a step portion, the second planet gear member being arranged on the step portion of the first planet gear member.

In other features, a ring gear is arranged about the plurality of planet gears, the ring gear including an inner annular surface including a plurality of ring gear teeth operatively connected with the plurality of planet gears.

In other features, the ring gear is a double helical gear including a first ring gear section and a second ring gear section, the plurality of ring gear teeth including a first plurality of ring gear teeth on the first ring gear section and a second plurality of ring gear teeth on the second ring gear section.

In other features, the first helical gear of the first planet gear member is operatively connected with the first plurality of ring gear teeth and the second helical gear of the second planet gear member is operatively connected with the second plurality of ring gear teeth.

In other features, the carrier is grounded to the housing.

In other features, another planetary gear set is supported by the shaft, the another planetary gear set including another sun gear operatively connected to the ring gear, another plurality of planet gears operatively connected with the another sun gear, and another ring gear operatively connected to the another plurality of planet gears.

In other features, an output carrier is operatively connected to the another plurality of planet gears, the output carrier including a differential gear set operatively connected to the shaft.

In other features, the carrier is grounded relative to the housing and the output carrier is rotatable relative to the housing.

In other features, another shaft is operatively connected to the differential gear set, wherein the shaft defines a first half shaft, and the another shaft defines a second half shaft.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Planetary gear sets in a drive unit provide a number of benefits. First, they are compact. The gear set may fit into a housing having a relatively small form factor. They include fewer parts and thus are easier to cool that gear sets that employ gears that slide on parallel shafts. While possessing multiple benefits, planetary gear sets also possess drawbacks. Transferring power from a stator of an electric motor into a sun gear results in axial forces on gear components. The sun gear sits on a sun gear shaft. Axial forces on the sun gear shaft causes corresponding axial forces to be applied to planet gears. These axial forces create friction that reduces energy transfer efficiency and produces wear on bearing components.

Figure 1:
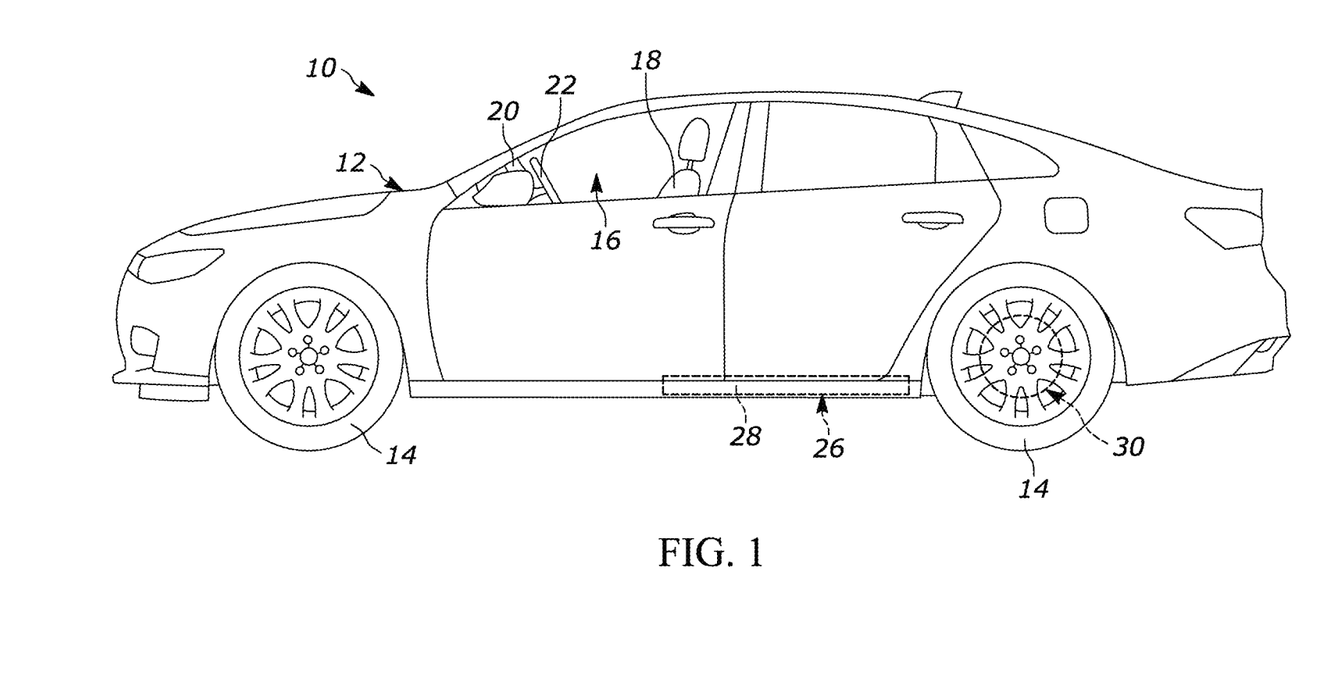
FIG. 1 is a left side view of a vehicle including a concentric planetary gear set having a dual helical gears, in accordance with the present disclosure.
Figure 2:
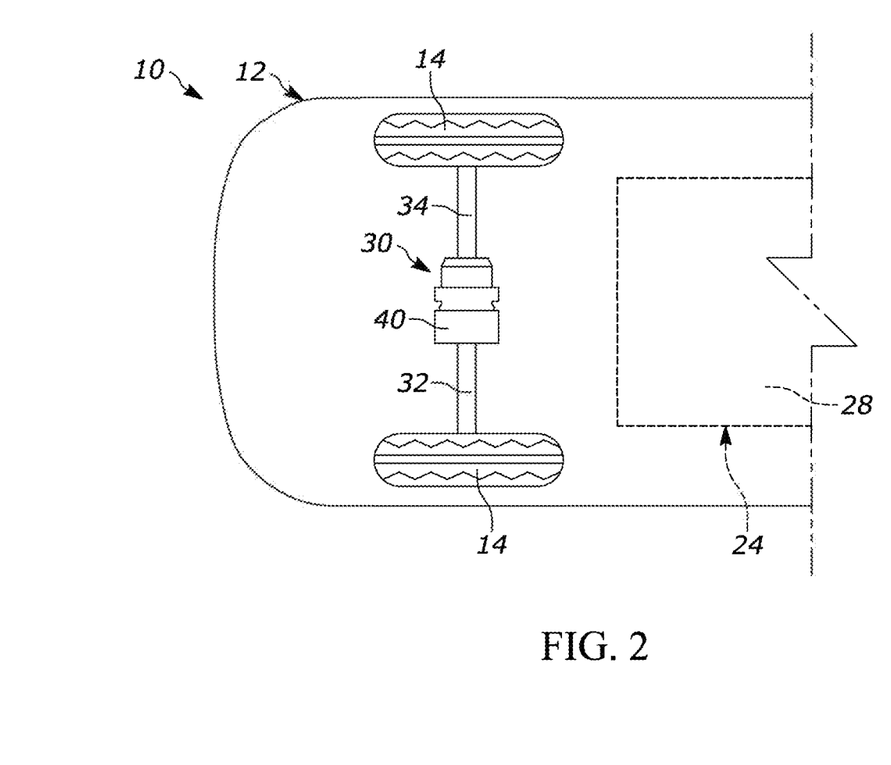
FIG. 2 is a bottom view of the vehicle of FIG. 1 depicting the drive unit connected to two wheels of the vehicle, in accordance with the present disclosure.

A vehicle, in accordance with the present disclosure, is indicated generally at 10 in FIGS. 1 and 2. Vehicle 10 includes a body 12 supported on a plurality of wheels, two of which are indicated at 14. Body 12 defines, in part, a passenger compartment 16 within which are positioned seats 18, a dashboard 20, and a steering wheel 22 arranged between seat 18 and dashboard 20. Body 12 supports an energy storage device 26 in the form of a battery 28. Battery 28 is connected to a drive unit 30 that provides motive power to vehicle 10. As shown in FIG. 2, drive unit 30 includes a first half shaft 32 connected to one of the plurality of wheels 14 and a second half shaft 34 connected to a second one of the plurality of wheels 14.

Figure 3:
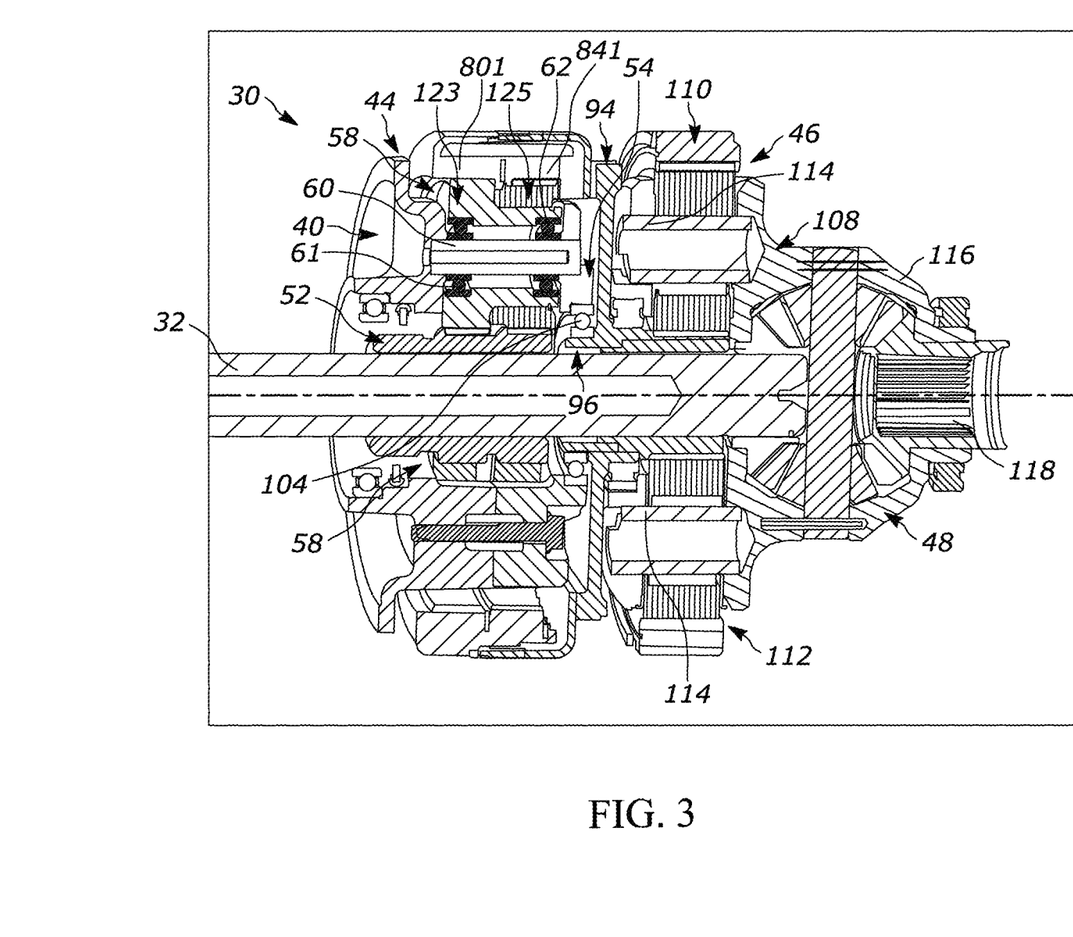
FIG. 3 is a cross-sectional side view of the drive unit, in accordance with the present disclosure.
Figure 4:
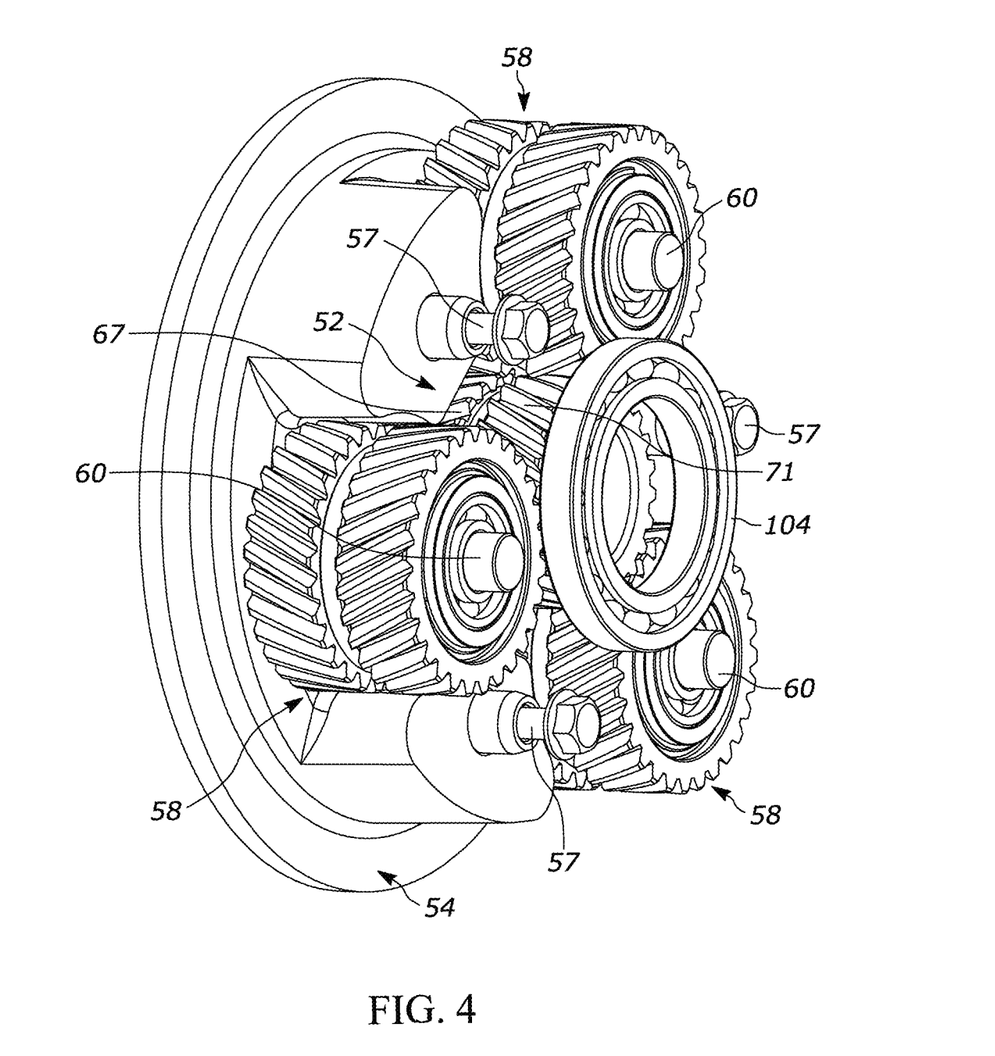
FIG. 4 is a glass view of a first planetary gear set of the drive unit of FIG. 3, in accordance with the present disclosure.

Referring to FIGS. 3 and 4 and with continued reference to FIG. 2, drive unit 30 includes a housing 40 within which is arranged a first planetary gear set 44, a second planetary gear set 46, and a differential gear set 48. As will become more fully evident herein, first planetary gear set 44 includes a sun-in/ring-out gear arrangement and second planetary gear set 46 includes a sun-in/carrier-out gear arrangement. First planetary gear set 44 includes a first sun gear 52, a first carrier 54, and a first ring gear 56. First carrier 54 is grounded to housing 40 through a plurality of fasteners 57 and supports a first plurality of planet gears 58. First plurality of planet gears 58 are mounted on first planet gear axles 60 which are supported by housing 40 through planet bearings 61 and 62.

Figure 5:
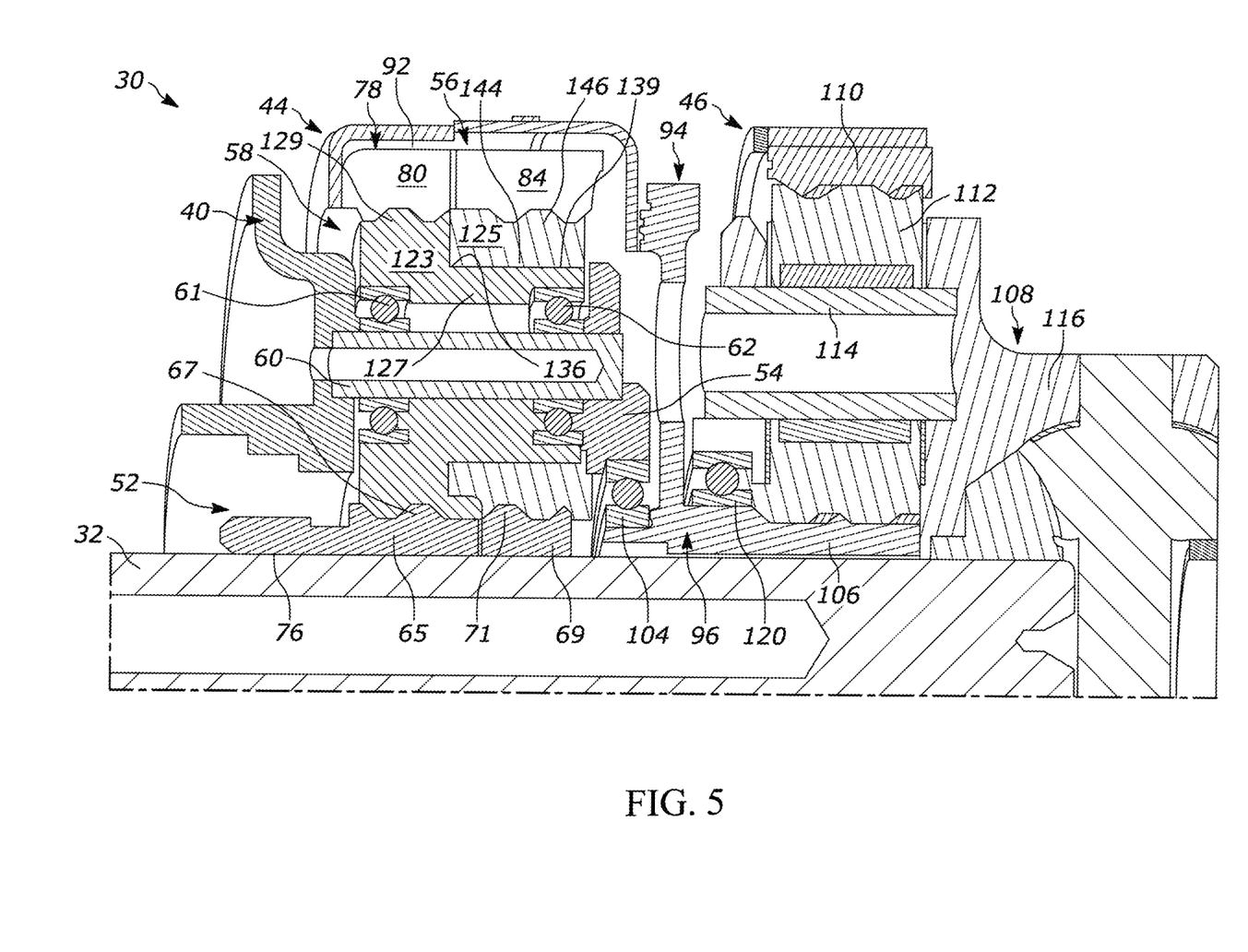
FIG. 5 is a partial cross-sectional side view of the first planetary gear set connected to a second planetary gear set of the drive unit, in accordance with the present disclosure.
Figure 6:
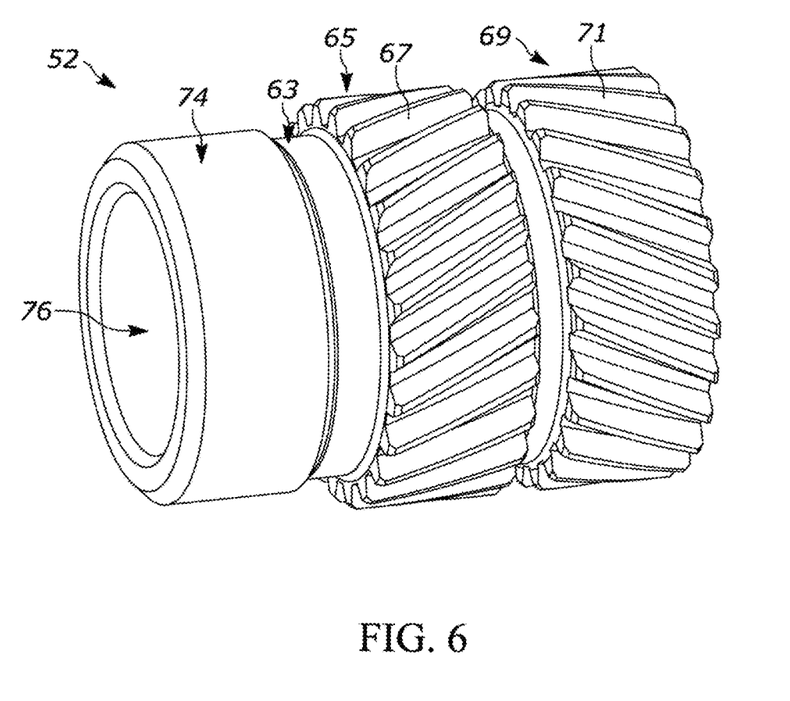
FIG. 6 is an upper right perspective view of a dual helical sun gear of the first planetary gear set, in accordance with the present disclosure.

Referring to FIGS. 5 and 6, first sun gear 52 is a dual helical sun gear 63 including a first helical gear portion 65 including a first plurality of gear teeth 67 having a first sun gear pitch and a second helical gear portion 69 including a second plurality of gear teeth 71 having a second sun gear pitch that is opposite to the first sun gear pitch. As will be detailed more fully herein, first helical gear portion 65 and second helical gear portion 69 interface with the first plurality of planet gears 58. Dual helical sun gear 63 also includes an input gear portion 74 that interfaces with a drive motor (not shown) which may be arranged in housing 40. Dual helical sun gear 63 includes a central passage 76 that provides a pathway for first half shaft 32 to connect with differential gear set 48.

Figure 7:
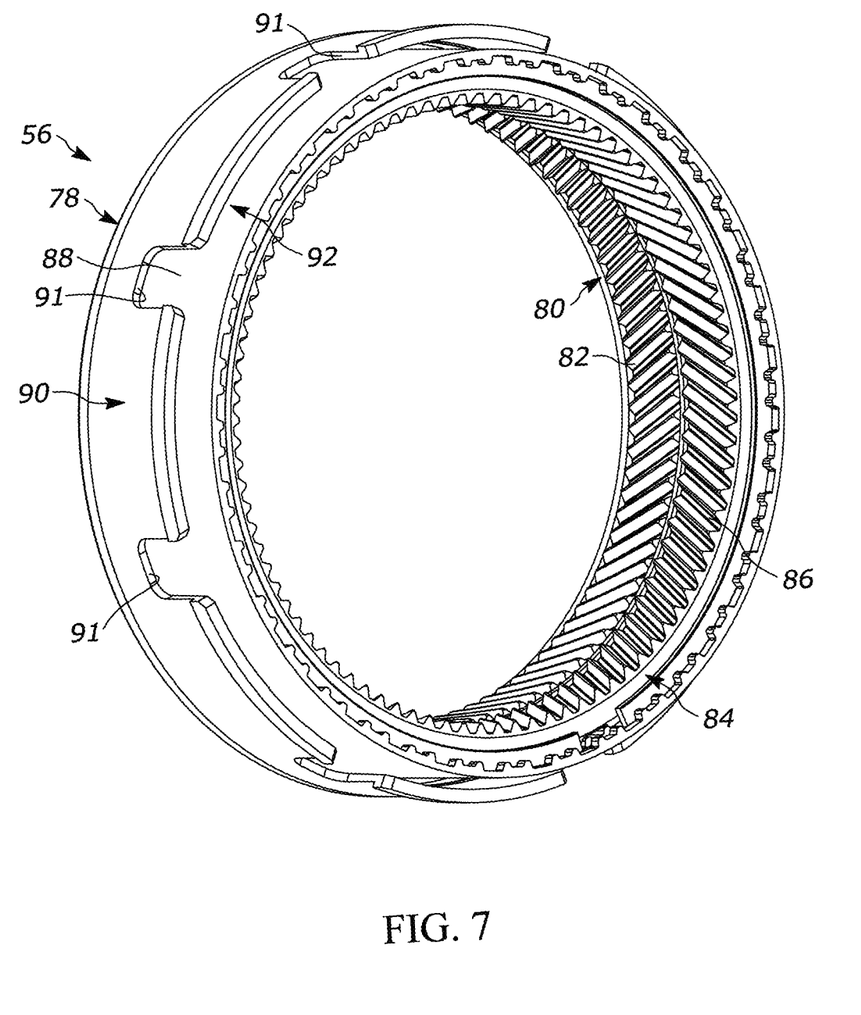
FIG. 7 is a right perspective view of a dual helical ring gear of the first planetary gear set, in accordance with the present disclosure.
Figure 8:
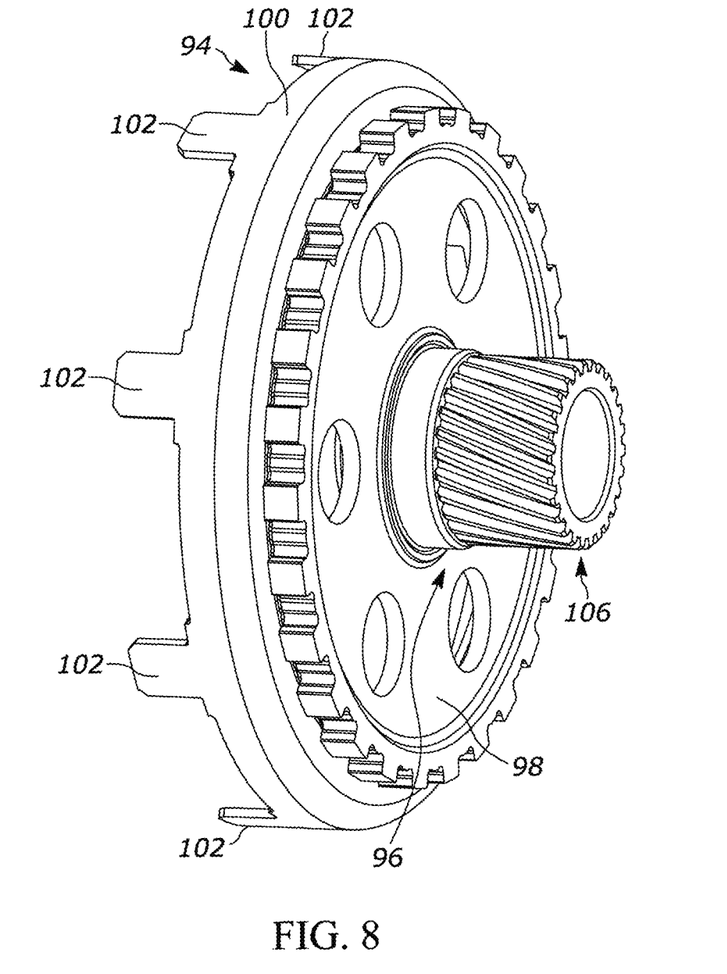
FIG. 8 is a right perspective view of a connecting gear and second sun gear, in accordance with the present disclosure.

In accordance with the present disclosure, first ring gear 56 takes the form of a dual helical ring gear 78 as shown in FIGS. 5 and 7. Dual helical ring gear 78 includes a first helical ring gear section 80 including a first plurality of ring gear teeth 82 having a first ring gear pitch connected to a second helical ring gear section 84 having a second plurality of ring gear teeth 86 having a second ring gear pitch that is opposite to the first ring gear pitch. Dual helical ring gear 78 includes an outer surface 88 and a coupler portion 90. Coupler portion 90, as shown in FIGS. 5 and. 8, includes a plurality of recesses 91 and is radially outwardly spaced from outer surface 88 by an annular gap 92. Coupler portion 90 attaches to a connector member 94 that acts as an interface between first planetary gear set 44 and second planetary gear set 46.

Referring to FIGS. 5 and 8 and with continued reference to FIG. 7, connector member 94 includes a central hub portion 96 that supports an annular web 98 having an outer annular edge 100. Outer annular edge 100 includes a plurality of tab elements 102 that interface with dual helical ring gear 78 and, more specifically, coupler portion 90 through recesses 91. Central hub portion 96 also supports a bearing 104 coupled to first carrier 54, and a second sun gear 106 that forms part of second planetary gear set 46.

Referring to FIGS. 3 and 5, second planetary gear set 45 also includes a second carrier 108, a second ring gear 110, and a second plurality of planet gears 112. Second plurality of planet gears 112 are rotatably supported on corresponding ones of second planet gear axles 114 mounted to second carrier 108. In a non-limiting example, second carrier 108 also forms part of a differential gear housing 116 that supports differential gear set 48. Differential gear housing 116 includes an output gear 118 that connects with second half shaft 38. Carrier 108/differential gear housing 116 is rotatably supported on central hub portion 96 of connector member 94 through a bearing 120.

In accordance with the present disclosure illustrated in FIG. 5, dual helical sun gear 63, and dual helical ring gear 78, together with the first plurality of planet gears 58 are designed to accommodate axial loading of first planetary gear set 44 and second planetary gear set 46. Each of the first plurality of planet gears 58 includes a first planet gear member 123 and a second planet gear member 125. Second planet gear member 125 is axially shiftable relative to first planet gear member 123. First planet gear member 123 includes a first hub portion 127 and a first gear portion 129. First hub portion 127 is mounted to first planet gear axle 60 through first and second bearings 131 and 133. First hub portion 127 includes a step portion 136 that forms an annular outer surface 139 on first planet gear member 123.

Second planet gear member 125 includes a second hub portion 144 that is supported on annular outer surface 139 of first planet gear member 123. Second hub portion 144 supports a second gear portion 146. First gear portion 129 of first planet gear member 123 meshingly engages with first helical gear portion 65 of dual helical sun gear 63 and first helical ring gear section 80 of dual helical ring gear 78. Similarly, second gear portion 146 meshingly engages with second helical gear portion 69 of dual helical sun gear 63 and second helical ring gear section 84 of dual helical ring gear 78.

With this construction, any axial forces that may be generated in first planetary gear set 44 are readily dissipated through an axial shifting of second planet gear member 125 relative to first planet gear member 123. Moreover, first ring gear 56 and first carrier 54 are completely isolated from any axial forces without interrupting or reducing energy transfer from the drive motor connected to input gear portion 74 to first half shaft 32 and second half shaft 34. Isolating first planetary gear set 44 and the second planetary gear set 46 from axial forces reduces wear and stress on system components that improves an overall service life for the drive unit. Isolating the axial stresses also reduces noise from the drive unit. Increasing the overall service life and reducing noise improves an overall customer experience with the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A drive unit for a vehicle comprising:
   a housing;
   a shaft extending through the housing; and
   a planetary gear set arranged in the housing and operatively connected to the shaft and the housing; the planetary gear set comprising:
   a sun gear including a first helical gear portion and a second helical gear portion;
   a carrier arranged in the housing and axially offset relative to the sun gear; and
   a plurality of planet gears operatively connected with the sun gear, each of the plurality of planet gears including a planet gear support shaft operatively connected to the carrier, a first planet gear member supported by the planet gear support shaft including a first helical gear operatively connected to the first helical gear portion and a second planet gear member supported by the planet gear support shaft, the second planet gear member including a second helical gear operatively connected to the second helical gear portion, the second planet gear member being axially shiftable relative to the first planet gear member.

2. The drive unit according to claim 1, wherein the first planet gear member includes a step portion, the second planet gear member being arranged on the step portion of the first planet gear member.

3. The drive unit according to claim 1, further comprising a ring gear arranged about the plurality of planet gears, the ring gear including an inner annular surface including a plurality of ring gear teeth operatively connected with the plurality of planet gears.

4. The drive unit according to claim 3, wherein the ring gear is a double helical gear including a first ring gear section and a second ring gear section, the plurality of ring gear teeth including a first plurality of ring gear teeth on the first ring gear section and a second plurality of ring gear teeth on the second ring gear section.

5. The drive unit according to claim 4, wherein the first helical gear of the first planet gear member is operatively connected with the first plurality of ring gear teeth and the second helical gear of the second planet gear member is operatively connected with the second plurality of ring gear teeth.

6. The drive unit according to claim 3, wherein the carrier is grounded to the housing.

7. The drive unit according to claim 6, further comprising another planetary gear set supported by the shaft, the another planetary gear set including another sun gear operatively connected to the ring gear, another plurality of planet gears operatively connected with the another sun gear, and another ring gear operatively connected to the another plurality of planet gears.

8. The drive unit according to claim 7, further comprising an output carrier operatively connected to the another plurality of planet gears, the output carrier including a differential gear set operatively connected to the shaft.

9. The drive unit according to claim 8, wherein the carrier is grounded relative to the housing and the output carrier is rotatable relative to the housing.

10. The drive unit according to claim 9, further comprising another shaft operatively connected to the differential gear set, wherein the shaft defines a first half shaft, and the another shaft defines a second half shaft.

11. A vehicle comprising:
a body defining in part a passenger compartment;
an energy storage device supported by the body; and
a drive unit supported in the body and connected to the energy storage device, the drive unit comprising:
a housing;
a shaft extending through the housing; and
a planetary gear set arranged in the housing and operatively connected to the shaft and the housing; the planetary gear set comprising:
a sun gear including a first helical gear portion and a second helical gear portion;
a carrier arranged in the housing and axially offset relative to the sun gear; and
a plurality of planet gears operatively connected with the sun gear, each of the plurality of planet gears including a planet gear support shaft operatively connected to the carrier, a first planet gear member supported by the planet gear support shaft including a first helical gear operatively connected to the first helical gear portion and a second planet gear member supported by the planet gear support shaft, the second planet gear member including a second helical gear operatively connected to the second helical gear portion, the second planet gear member being axially shiftable relative to the first planet gear member.

12. The vehicle according to claim 11, wherein the first planet gear member includes a step portion, the second planet gear member being arranged on the step portion of the first planet gear member.

13. The vehicle according to claim 11, further comprising a ring gear arranged about the plurality of planet gears, the ring gear including an inner annular surface including a plurality of ring gear teeth operatively connected with the plurality of planet gears.

14. The vehicle according to claim 13, wherein the ring gear is a double helical gear including a first ring gear section and a second ring gear section, the plurality of ring gear teeth including a first plurality of ring gear teeth on the first ring gear section and a second plurality of ring gear teeth on the second ring gear section.

15. The vehicle according to claim 14, wherein the first helical gear of the first planet gear member is operatively connected with the first plurality of ring gear teeth and the second helical gear of the second planet gear member is operatively connected with the second plurality of ring gear teeth.

16. The vehicle according to claim 13, wherein the carrier is grounded to the housing.

17. The vehicle according to claim 16, further comprising another planetary gear set supported by the shaft, the another planetary gear set including another sun gear operatively connected to the ring gear, another plurality of planet gears operatively connected with the another sun gear, and another ring gear operatively connected to the another plurality of planet gears.

18. The vehicle according to claim 17, further comprising an output carrier operatively connected to the another plurality of planet gears, the output carrier including a differential gear set operatively connected to the shaft.

19. The vehicle according to claim 18, wherein the carrier is grounded relative to the housing and the output carrier is rotatable relative to the housing.

20. The vehicle according to claim 19, further comprising another shaft operatively connected to the differential gear set, wherein the shaft defines a first half shaft, and the another shaft defines a second half shaft.

* * * * *